United States Patent

[11] 3,599,926

| [72] | Inventor | Yukio Takahashi<br>Yokohama-shi, Japan |
| --- | --- | --- |
| [21] | Appl. No. | 860,767 |
| [22] | Filed | Sept. 24, 1969 |
| [45] | Patented | Aug. 17, 1971 |
| [73] | Assignee | Honda Giken Kogyo Kabushiki Kaisha<br>Tokyo, Japan |
| [32] | Priority | Sept. 24, 1968 |
| [33] | | Japan |
| [31] | | 82887/68 |

[54] REARVIEW-MIRROR ATTACHING APPARATUS FOR VEHICLE
3 Claims, 3 Drawing Figs.

| [52] | U.S. Cl. | 248/475 A,<br>248/205 R |
| --- | --- | --- |
| [51] | Int. Cl. | B60r 1/06,<br>E04b 1/00 |

[50] Field of Search............................................ 248/1, 205,
300, 475 R, 475 A, 475 B, 476, 477; 85/72; 94/1.5;
52/98, 99, 100; 285/2; 74/492; 287/DIG. 3

[56] References Cited
UNITED STATES PATENTS

| 1,127,849 | 2/1915 | Barnes | 285/2 X |
| --- | --- | --- | --- |
| 2,364,165 | 12/1944 | Sarnes | 248/475 R |
| 3,367,617 | 2/1968 | Ellis | 248/300 X |
| 3,436,049 | 4/1969 | De Claire et al. | 248/475 A UX |

*Primary Examiner*—William H. Schultz
*Attorney*—Waters, Roditi, Schwartz & Nissen ABSTRACT: A breakoff rearview mirror attachment including an attaching base connected by a bolt to a breakable or frangible plate which is in turn connected to a vehicle body by a further and separate connecting member. The attaching base has a pin extending through the plate and body. The plate is provided with a groove encircling the connecting member.

PATENTED AUG 17 1971  3,599,926

INVENTOR
Yukio Takahashi

REARVIEW-MIRROR ATTACHING APPARATUS FOR VEHICLE

DETAILED EXPLANATION OF INVENTION

There exists the danger, during running of a vehicle such as an auto, a motorcycle or the like, that a rearview mirror attached to the exterior of the vehicle may strike a passerby and injure him. There also exists the danger that, as a result of a shock caused by a car's sudden stop or due to a collision or the like, a driver might strike his head against a rearview mirror provided within the car's interior and be injured.

As a safety measure and to meet these dangers, it has been recently proposed that a rearview mirror be so constructed that, when given a shock exceeding a predetermined limit, the mirror will rotate or be disconnected at its attaching base portion whereby the effective shock is weakened.

This invention relates to a rearview mirror-attaching apparatus of the type wherein the mirror is disconnected when an excessive shock is applied thereto. An object of the invention is to make a vehicle body arrangement which reduces the possibility of injury by means of the above indicated disconnection and to provide for facilitating repair of the same.

GENERAL EXPLANATION OF DRAWING

Figure 1:
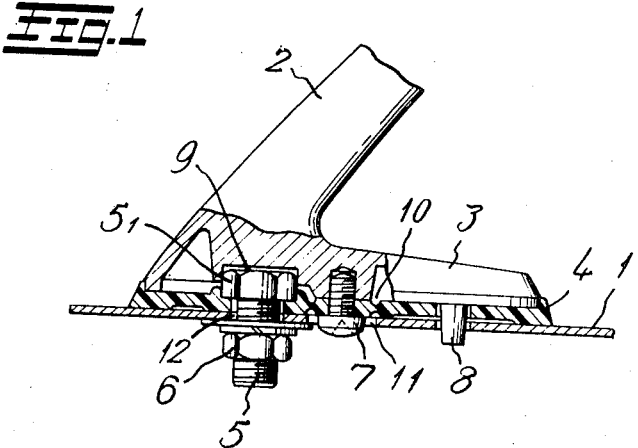
FIG. 1 is a sectional side view if a mirror-attaching apparatus of this invention.

In the drawing, element 1 is a car body part such as a fender to which a rearview mirror is to be attached, element 2 being an attaching arm for the mirror and element 3 being an attaching base formed at the base end portion of the attaching arm 2. When this attaching base 3 is to be attached to the car body part 1, a baseplate or breakable member 4 is interposed between the attaching base 3 and the car body part 1. Baseplate 4 is attached to the car body part 1 by means of a bolt 5 and a nut 6 and is attached to the attaching base 3 by means of a screw 7. Plate 4 is arranged to be easily broken by an excessive shock, for example, at a portion around the screw 7 or around the bolt 5.

Element 8 is a positioning and antirotation pin projecting from the bottom surface of the attaching base 3. This pin 8 has a length of such magnitude as to extend through the baseplate 4 and the car body part 1. Numeral 9 denotes a hexagonal cavity provided in the bottom surface of the attaching base 3 for allowing the head portion $5_1$ of the bolt 5 to be mounted therein. This cavity 9 serves not only to prevent rotation of the bolt 5 but also to stabilize the attaching of the rearview mirror.

The baseplate 4 is preferably a synthetic resin plate and can also serve as a packing. It is easily broken since it is thin or is provided with an annular groove 10 around the screw 7. A similar annular groove can be provided around the bolt 5.

At 11 is shown an opening in the car body part 1. This opening is large enough that the screw 7 does not touch the car body part 1.

The order of attachment will now be explained with reference to the illustrated example.

The bolt 5 is, first, inserted through the baseplate 4, and this combination is put on the bottom surface of the attaching base 3 so that the head portion $5_1$ of the bolt 5 is between the attaching base 3 and the baseplate 4. The screw 7 is applied so that the baseplate 4 is integrally secured to the attaching base 3. Next, the attaching base 3 and the baseplate 4 are put on the car body part 1 while the bolt 5, the head of the screw 7 and the pin 8 respectively enter a bolt opening 12, the opening 11 and positioning opening 13 in the car body part 1. Then the nut 6 is applied to the bolt 5 from the rear surface of the car body part 1 and is tightened.

Figure 2:
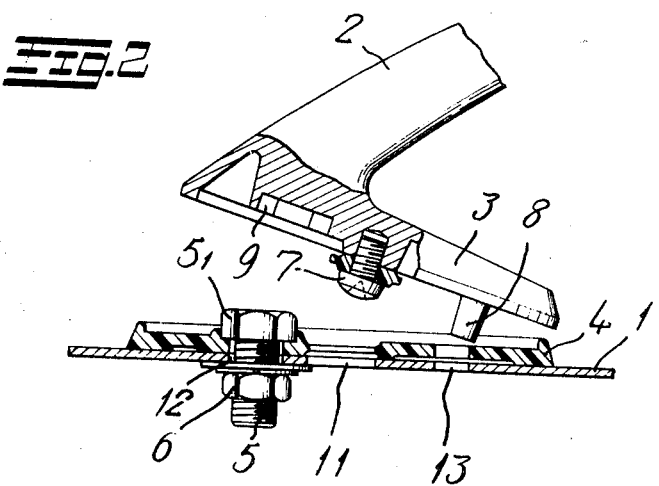
FIG. 2 is a sectional side view of the attaching apparatus of FIG. 1 showing the same disconnected by a shock applied thereto.
Figure 3:
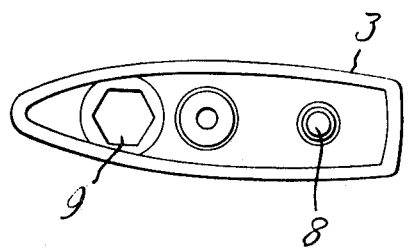
FIG. 3 is a bottom plan view of the attaching base.

In the apparatus described above, the baseplate 4 is interposed between the attaching base 3 of the rearview mirror and the car body 1, and the baseplate 4 is separately secured to the attaching base 3 and to the car body 1, so that the rearview mirror is not attached directly to the car body. Additionally, the baseplate 4 is arranged to be easily broken by an excessive shock, breakage taking place, for example, at a portion around the screw 7 or around the bolt 5. Thus, when the rearview mirror strikes a passerby or a driver bumps his head against the rearview mirror, the baseplate 4 breaks, for example, as shown in FIG. 2 so that the mirror is disconnected. Thereby, the shock is limited and the danger mentioned above is decreased or eliminated.

Since what is broken upon disconnection of the rearview mirror is only the baseplate 4, no damage to the car body part 1 results and repair can be simply carried out at a low cost by only replacing the baseplate 4 with a new one.

What I claim is:

1. Apparatus for attachment to a vehicle body part comprising a mirror support including an attaching arm and an attaching base integral with said arm, a baseplate of synthetic resin interposed between the attaching base and the vehicle body part, said attaching base being constructed of a stronger material than said resin, a screw detachably connecting the attaching base to said baseplate, said baseplate having an annular groove therein surrounding said screw so that said baseplate can be readily broken at said groove by application of force, and a bolt and nut attaching the baseplate to the vehicle body part.

2. Apparatus as claimed in claim 1 wherein said bolt includes a head and said attaching base has a cavity accommodating said head.

3. Apparatus as claimed in claim 1 including a pin on said attaching base extending through the plate and part to align the mirror support on the plate and part and prevent relative movement therebetween.